No. 672,056.  
J. F. DAVEY & S. W. LADD.  
CLUTCH.  
(Application filed Mar. 31, 1897.)  
Patented Apr. 16, 1901.
(No Model.)
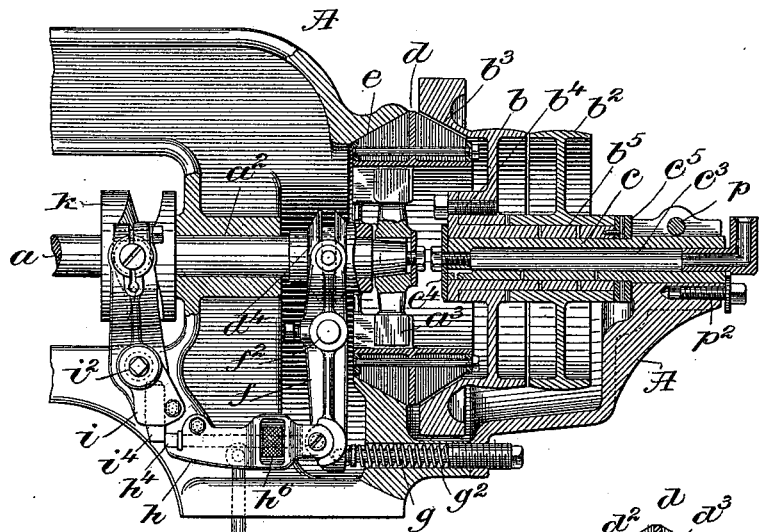
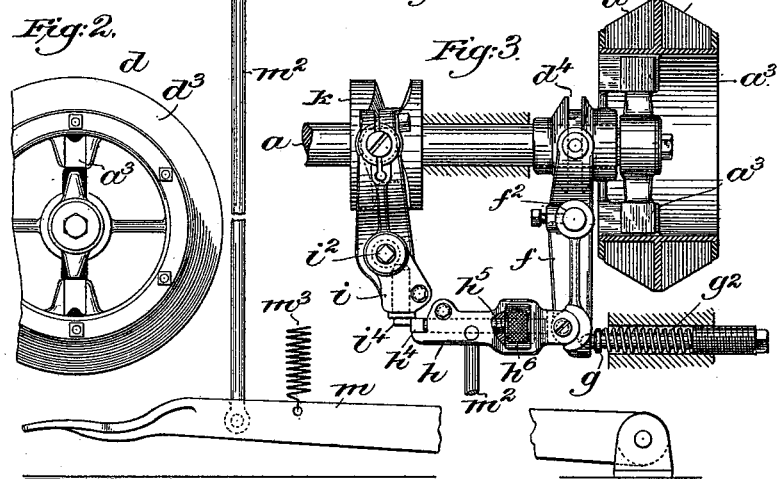
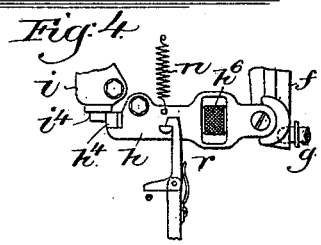
Witnesses:  
John F. C. Preinkert  
Jas. J. Maloney
Inventors,  
John F. Davey  
Sherman W. Ladd  
by their Atty.

UNITED STATES PATENT OFFICE.

JOHN F. DAVEY AND SHERMAN W. LADD, OF BEVERLY, MASSACHUSETTS, ASSIGNORS TO THE DAVEY PEGGING MACHINE COMPANY, OF PORTLAND, MAINE, AND BOSTON, MASSACHUSETTS.

CLUTCH.

SPECIFICATION forming part of Letters Patent No. 672,056, dated April 16, 1901.

Application filed March 31, 1897. Serial No. 630,061. (No model.)

*To all whom it may concern:*

Be it known that we, JOHN F. DAVEY and SHERMAN W. LADD, of Beverly, county of Essex, and State of Massachusetts, have invented an Improvement in Clutches, of which the following description, in connection with the accompanying drawings, is a specification, like letters on the drawings representing like parts.

This invention relates to a clutch and is shown as embodied in a clutch adapted to be used on sewing-machines, nailing-machines, and in machines in which it is desirable to stop the machine at a definite point in its cycle of movements—as, for example, in the case of the sewing-machine when the needle is at its highest position, or in the case of a nailing-machine after the nail is driven and when the parts are in the position to receive the material or at a position to receive the nail to be driven at the next operation of the machine. The said clutch comprises a friction member connected with the driving-shaft to rotate in unison therewith, but having independent longitudinal movement thereon. Said friction member has friction-surfaces at opposite sides, one adapted to coöperate with a socket in the main frame to act as a brake to stop its rotation and the other adapted to coöperate with a corresponding surface or socket in the driving-pulley. The main shaft, that is driven by the clutch when its movable friction member is engaged with the driving-pulley and disengaged from the brake, is provided with a cam coöperating with shifting mechanism by which said friction member of the clutch is shifted from engagement with the driving-pulley to engagement with the stationary brake at a definite point in the rotary movement of the main shaft, thus causing said main shaft to be stopped at a definite point in its movement, its arrest, however, being the result of frictional action rather than impact, and thus taking place without severe shock to the working parts of the machine. Said shifting mechanism comprises a trip-arm adapted to be operated by a handle or treadle which enables the shiftable friction clutch member to be freed from the influence of the stop-cam and shifted from engagement with the brake into engagement with the driving-pulley in order to start the machine at the will of the operator under the control of the handle or treadle.

Figure 1 is a longitudinal section of the clutch embodying the invention and is a sufficient portion of the machine to illustrate the application of said clutch thereto; Fig. 2, a detail showing in end elevation the shiftable friction member of the clutch and main shaft on which it is supported; Fig. 3, a detail showing in side elevation and partly in section the shiftable clutch member and devices for controlling the shifting movement thereof to stop and start the machine as required, and Fig. 4 a detail showing a modification of the means for operating the driving or starting lever controlling the driving engagement of the clutch.

The machine is shown as provided with the main shaft $a$, adapted to rotate in suitable bearings, one of which is shown at $a^2$ in the main frame A. The said main shaft $a$ is intended to actuate the working parts of the machine whatever they may be and to make one complete rotation at each complete cycle of movements of the machine.

The machine is shown as provided with a driving-belt pulley $b$ and a loose-belt pulley $b^2$, both adapted to turn freely with relation to a bearing support or spindle $c$, fixed in the main frame A in line with, but wholly disconnected from, the main actuating-shaft $a$ of the machine. The said driving-pulley $b$ is adapted to be connected to and disconnected from the main shaft $a$ by the clutch and stop mechanism comprising a friction member $d$, itself loose and longitudinally movable on the main shaft $a$, but engaged with a cross-head $a^3$, fixed on said main shaft $a$, so that said friction member $d$ and main shaft $a$ have the same rotary movement, said shaft being driven by said friction clutch member when it is engaged with and driven by the pulley $b$ and held stationary when said friction clutch member is held stationary. The said clutch member $d$ has a friction-surface $d^2$, adapted to engage with a socket $e$ in the main frame to act as a brake to stop its rotation and that of the main shaft when said clutch member is disengaged from a similar friction-surface $b^3$ in the driving-pulley $b$. Said clutch member $d$ is provided with a friction-surface $d^3$ on the end opposite to the friction-surface $d^2$, which engages with said friction-surface $b^3$ in the driving-pulley $b$, a slight longitudinal movement of said friction member $d$ in one direction on the main shaft throwing it out of engagement with the brake $e$ and into engagement with the driving-pulley $b$, while a similar slight movement in the opposite direction throws said clutch member out of engagement with the driving-pulley and into engagement with the brake, as shown in Fig. 1. The said friction member is thus moved lengthwise of the main shaft to engage with the driving-pulley or with the brake, as may be required, by means of a shifting-lever $f$, pivoted at $f^2$ on the main frame and engaged at its upper end with a grooved hub $d^4$ on the shifting clutch member $d$, the lower end of said lever $f$ being acted upon at one side by a spring-pressed plunger $g$, tending to force the clutch member $d$ into engagement with the driving-pulley $b$, so as to set the machine in operation. Said shifting-lever $f$ is acted upon lengthwise in opposition to said spring-pressed plunger $g$ by a trip-arm or trigger $h$, pivotally connected with the lower end of said shifting-lever $f$ and adapted to be engaged with or disengaged from a stopping-lever $i$, pivoted at $i^2$ on the main frame and operated by a cam $k$ on the main shaft $a$, which cam at each rotation of the main shaft moves the lever $i$, so that if the trip-arm $h$ is engaged therewith the clutch member $d$ will be moved out of engagement with the driving-pulley $b$ and into engagement with the brake $e$ and arrested thereby at a point in the rotary movement of the main shaft determined by the position of the cam $k$ thereon. The engagement of the trip-arm $h$ with the stop-lever $i$ is, as shown in this instance, controlled by a treadle $m$, connected with said trip-arm $h$ by a rod or link $m^2$. When the treadle $m$ is depressed, the trip-arm $h$ is disengaged from the stop-lever $i$, and the clutch member $d$ is thrown into engagement with the driving-pulley $b$ by the action of the spring $g^2$ on the plunger $g$ of the shifting-lever $f$. The depression of the treadle therefore closes or engages the clutch for driving action and starts the machine, which in the construction shown in Figs. 1 and 3 will run continuously as long as said treadle and trip-arm $h$ remain depressed. When, however, it is desired to stop the machine, the said treadle $m$ is released and being normally pressed upward by a spring $m^3$ or otherwise tends to lift the trip-arm $h$, and at the proper time in the vibration of the stop-lever $i$ said trip-arm will slip past and into engagement therewith, so that when said lever $i$ is vibrated in the proper direction by the cam $k$ the clutch member $d$ will be disengaged from the driving-pulley and thrown into engagement with the brake $e$, and thus stop promptly, but without shock, at a point determined by the throw of the cam $k$, acting through the shifting mechanism (lever $i$, trip $h$, and lever $f$) on the movable clutch member. The trip-arm $h$ and stop-lever $i$ are provided with suitably-hardened engaging fingers $h^4$ $i^4$, clamped in sockets in said levers, and said projection $h^4$ in the trip-arm is provided with a threaded shank or stem $h^5$, coöperating with the nut $h^6$, which turns in a slot in the lever $h$ and when rotated screws the stem $h^5$ out or in, so that the end of the projection $h^4$ may be properly adjusted to cause the clutch member $d$ to engage properly with the brake $e$ to stop the main shaft just about as the extreme throw of the cam $k$ or the lever $i$ is reached. The machine is thus stopped automatically at a definite point in the rotation of the main shaft $a$, and therefore at a definite point in the cycle of operations of the instrumentalities actuated by said main shaft.

The bearing-support $c$ for the fast and loose pulleys $b$ $b^2$ is shown as a dead or non-rotating spindle, and the driving-pulley $b$ is secured by screws $b^4$ to a sleeve $b^5$, which turn on the spindle $c$ and itself affords a bearing for the loose pulley $b^2$. Thus a long bearing-surface is afforded for both pulleys. The spindle $c$ is hollow and is provided with an oil-inlet duct $c^3$, and suitable perforations are made in said spindle and in the sleeve $b^5$ to distribute the oil upon the internal and external surfaces of said sleeve, which is held without longitudinal movement on the spindle $c$ by a collar $c^4$, secured to the inner end of said spindle. The other end of the sleeve $b^5$ and of the hub of the loose pulley $b^2$ is engaged by a washer $c^5$, resting against a shoulder on the spindle $c$, and said spindle is held fast in a suitable bearing-socket in the main frame, said socket being split and provided with a clamping-bolt $p$ to hold said spindle firmly. The spindle may be adjusted longitudinally in its bearing-socket to move the driving-pulley $b$ into proper proximity to the movable clutch member $d$, by means of a screw $p^2$, having a collar engaging with the end of the spindle $c$ to facilitate said adjustment. The washer $c^5$ sustains the longitudinal thrust on the driving member of the clutch due to the pressure of the driven member $d$ when the driving and driven members of the clutch are engaged.

By having the pulleys $b$ $b^2$ run on a shaft or bearing independent of the main driven shaft $a$ the momentum of the driven parts when the clutch is disengaged is reduced to a minimum.

If it is desired to have the main shaft make only a single rotation when the machine is set in operation, the trip $h$, instead of being directly connected with the treadle or starting-handle for the machine, as shown in Figs. 1 and 3, may be connected therewith through a trip-latch, such as shown at $r$, Fig. 4, by which said trip is disconnected from the treadle or starting-handle immediately after it has been disengaged thereby from the stop-lever *i*, and in this case the said trip *h* is yieldingly held upward, as by a spring *n*, so that when the lever *i* moves outward with relation to the end of the said trip *h* in response to the rotation of the cam *k* said trip will be immediately engaged with said stop-lever and the machine stopped at the end of the rotation of the main shaft, ready to be started again by a rise, followed by a depression of the treadle, which will cause a reëngagement of the latch *r* with the trip *h*.

We claim—

1. The combination with the main shaft and clutch member connected to rotate therewith but capable of independent longitudinal movement thereon, of a driving clutch member provided with a belt-pulley, a non-rotating bearing support or spindle for said driving member in line with said main shaft, said driving clutch member having a sleeve bearing on said spindle, and a loose pulley having its bearing upon the said sleeve of the driving clutch member, substantially as described.

2. The combination of the driving clutch member of the machine provided with a friction-surface; with the main shaft, and a driven clutch member connected to rotate therewith but capable of independent longitudinal movement thereon and provided with friction-surfaces at its opposite ends; and a stationary friction-surface or brake, and means for impelling said driven clutch member into engagement with the friction-surface of the driving member, and connecting mechanism between the main driven shaft and driven clutch member for moving said driven clutch member out of engagement with the driving member and into engagement with the brake, substantially as described.

3. The combination of the main shaft to be driven, with a clutch governing the operation of said shaft, comprising a driven clutch member connected to rotate with said shaft, but capable of independent longitudinal movement thereon; and provided with friction-surfaces at its opposite ends; a stationary friction-surface constituting a brake adjacent to one of the friction-surfaces of said clutch member; a driving clutch member provided with a friction-surface adjacent to the other friction-surface of the said driven clutch member; and a non-rotating bearing-spindle for said driving clutch member in line with and independent of the said main shaft, substantially as described.

4. The combination of the driving-pulley of the machine, provided with a friction-surface; with the main shaft, and a clutch member connected to rotate therewith but capable of independent longitudinal movement thereon and provided with friction-surfaces at its opposite ends; and a stationary friction-surface or brake; a cam on said driven shaft; and a trip-arm adapted to be actuated by said cam, whereby said clutch member is shifted from engagement with one to engagement with the other of said friction-surfaces, substantially as described.

5. The combination of the driving-pulley of the machine, provided with a friction-surface; with the main shaft, and a clutch member connected to rotate therewith but capable of independent longitudinal movement thereon, and provided with friction-surfaces at its opposite ends; a stationary friction-surface or brake, a cam on said driven shaft; and a trip-arm adapted to be actuated by said cam, whereby said clutch member is shifted from engagement with one to engagement with the other of said friction-surfaces, said trip-arm being yieldingly presssed in the opposite direction whereby when disengaged from said cam the clutch is shifted in the reverse direction, substantially as described.

6. The combination of the main shaft to be driven, with a clutch governing the operation of said shaft, comprising a driven clutch member connected with said shaft and provided with friction-surfaces at its opposite ends; a stationary friction-surface constituting a brake adjacent to one of the friction-surfaces of said driven clutch member; and a driving clutch member having a friction-surface adjacent to the other of the friction-surfaces of the said driven clutch member; and means actuated by the main shaft for automatically disengaging the said driven clutch member from the driving clutch member, and engaging it with the brake at a predetermined point in the rotation of said main shaft whereby said main shaft is stopped in a predetermined angular position, substantially as described.

In testimony whereof we have signed our names to this specification in the presence of two subscribing witnesses.

JOHN F. DAVEY.
SHERMAN W. LADD.

Witnesses:
H. J. LIVERMORE,
NANCY P. FORD.